No. 77,465.
E. DAYTON.
CEMENT WATER PIPE.
PATENTED MAY 5, 1868.
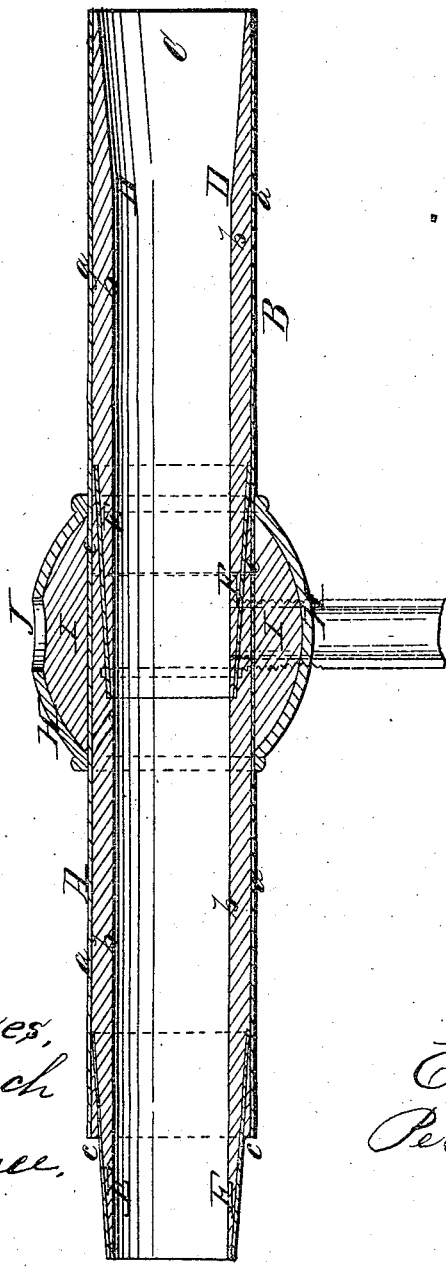

United States Patent Office.

EDWIN DAYTON, OF MERIDEN, CONNECTICUT.

Letters Patent No. 77,465, dated May 5, 1868.

IMPROVEMENT IN CEMENT WATER-PIPES.

The Schedule referred to in these Letters Patent and making part of the same.

TO ALL WHOM IT MAY CONCERN:

Be it known that I, EDWIN DAYTON, of Meriden, in the county of New Haven, and State of Connecticut, have invented a new and useful Improvement in Cement Water-Pipes; and I do hereby declare that the following is a full, clear, and exact description thereof, which will enable those skilled in the art to make and use the same, reference being had to the accompanying drawings, forming part of this specification.

The present invention relates particularly to the manner of jointing the ends of water-pipes together, of that class of such pipes which are commonly called cement water-pipes, and are formed of a tube or pipe of sheet metal, lined or coated upon the inside, or upon both the inside and outside, with the cement ordinarily used for such purposes; and this invention consists in jointing the said pipes together, by tapering the end of one pipe upon its inside, for a portion of its length, in combination with so forming the end of the other pipe, which is to be joined thereto, as to fit within the said inside tapered end, and to produce a pipe of an even and uniform diameter, both upon its inside and outside, the two pipes thus joined being secured together by cementing them at their joints, or by using a collar or ring or thimble over such joint, and cementing it in turn to the pipes.

And this invention also consists in using a metallic collar over the joints of the pipe-sections, provided with one or more holes along its sides, for filling the space between it and about the pipes with cement.

By using a collar over the joints of the pipe, of the form above stated, two important advantages are obtained, viz, the sections of the pipes can be laid more even and straight in direction, and a pipe can be tapped at its joints in a much better and more serviceable manner than with the ordinary collars employed, or with the usual mode of jointing together cement water-pipes.

In the accompanying plate of drawings my improvements in cement water-pipes are illustrated, the figure being a section through two sections of a pipe jointed together according to my invention, which section is taken in the direction of the length of the pipe.

A and B, in the drawings, represent the two sections of a pipe, of that class of pipes known as "cement water-pipes," and which are made of a sheet-metal tube, $a$, lined or coated upon its inside with cement, $b$, suitable for the purpose, these pipes being, in some cases, also coated upon their outside with cement.

One end, $C_2$, of each section A and B of the pipe, is made of a tapering shape upon its inside, from its end inward, terminating at a point, D, a short distance from the end, with the other ends, E, of such pipe-sections, made of a conical or tapering shape upon their outside, corresponding to that upon the inside of the other ends of the pipes, so as to nicely fit therein, and not only form an even, smooth, and uniform bore to the pipe throughout its whole extent, but also produce a pipe which, when thus united together by its several sections, will be uniform and even in its external diameter, the conical end of one section of the pipe coming to a stop by its shoulder against the end of the tapered section.

Instead of making the end of one section of the pipe of conical shape, to fit into a corresponding opening in the inside of the other section, I prefer to construct the part E of a short piece of pipe, resembling a truncated cone, the base of which is inserted in one section of the pipe, as seen at C, and the opposite end in the other section. The cement is then applied, to make the joint water-tight, part of the cement being upon the inside, and part upon the outside of the part E.

The sections of the pipe jointed together as above described, may be there secured, by cementing in the line of their juncture, or by using a collar, ring, or thimble about the same, which, in its turn, is to be secured to the pipe by cementing. The collar H, which I prefer to use, and which forms, as hereinabove stated, a part of the present invention, is made of a diameter corresponding, or nearly so, to the external diameter of the pipes, so as to hold each section of the pipes passing through such collar in a more even and perfect line, and is provided with a hole, J, upon its sides, for enabling the space I, between the inside of the collar and the outside of the pipe, to be filled with cement, so as to hold it to the pipes, as well as to hold the sections of the same together, this collar also enabling the pipes to be tapped in a much better and more reliable manner than with the collar heretofore employed for a similar purpose, one manner of doing which is shown in red lines in the drawings.

As to the collar H, I find it most desirable to use one which is made of a bulging shape between its two ends, as is shown in the drawings, for the reason that more space is thus afforded for the cement.

*a*, a packing-ring or band, placed upon and around the tapering or conical end of the pipe-section, between which and the inside taper of the other section it is wedged, as the one pipe-section is driven or forced into the other, whereby a closer and tighter joint is produced between the two.

I am aware that pipes have been before used, having the outer connection at their joints, and I do not, therefore, claim such connection.

I do not claim a socket-joint, made by enlarging the end of the pipe, as I am aware that this has been done before; but What I do claim as new, and desire to secure by Letters Patent, is—

1. The short pipe E, of tapering shape, fitting into the adjoining ends of the pipes A B, to form a water-tight joint, and coated upon the inner and outer sides equally, with cement, as herein shown and described.

2. I also claim the packing-ring or band *a*, applied to the pipe-sections, substantially as and for the purpose described.

EDWIN DAYTON.

Witnesses:
WM. F. MCNAMARA,
ALBERT W. BROWN.